March 18, 1952 P. E. GELDHOF 2,589,796
VIBRATION REDUCING SUPPORT FOR
WASHING MACHINES AND THE LIKE
Filed May 23, 1946 3 Sheets-Sheet 2

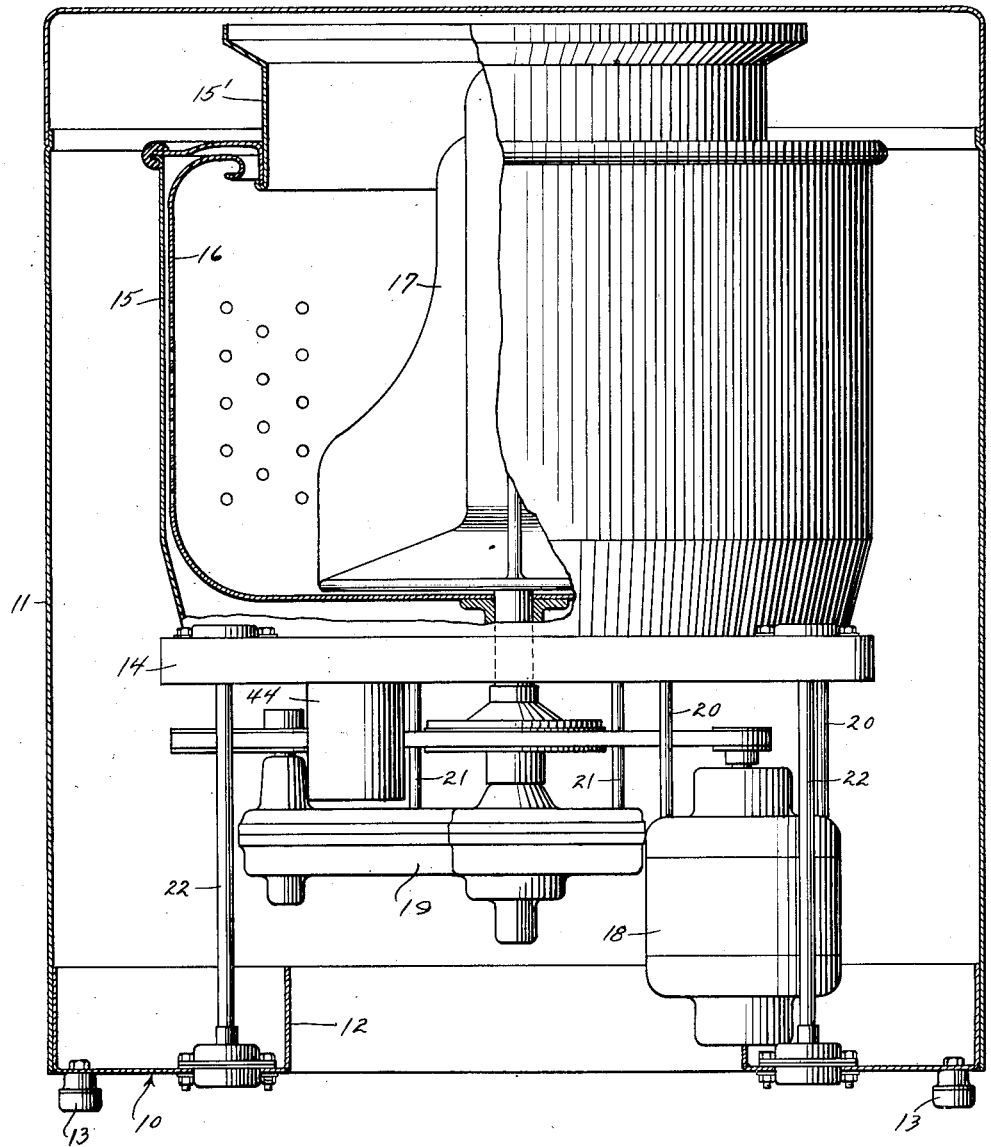

Inventor
Peter Eduard Geldhof

March 18, 1952 P. E. GELDHOF 2,589,796
VIBRATION REDUCING SUPPORT FOR
WASHING MACHINES AND THE LIKE
Filed May 23, 1946 3 Sheets-Sheet 3
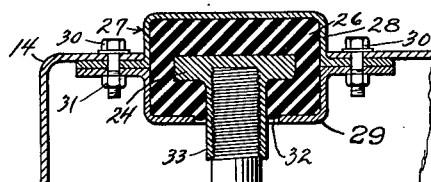
Fig-2
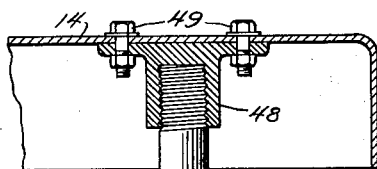
Fig-6
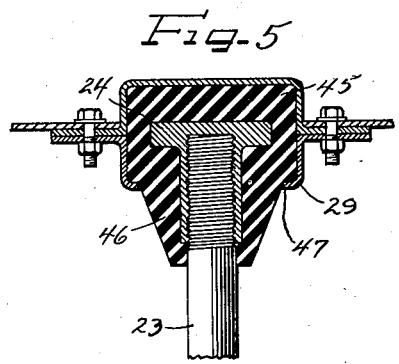
Fig-5
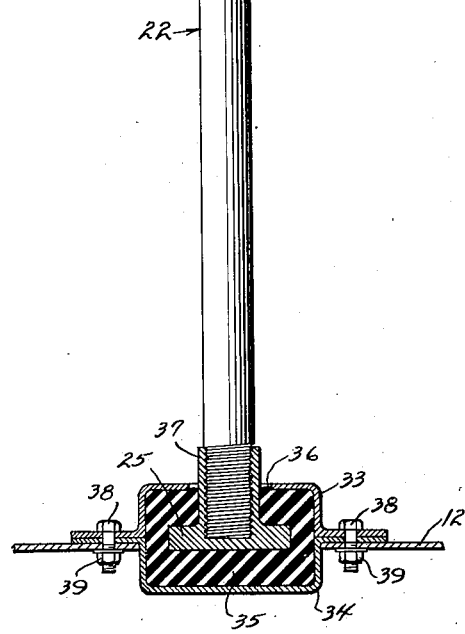
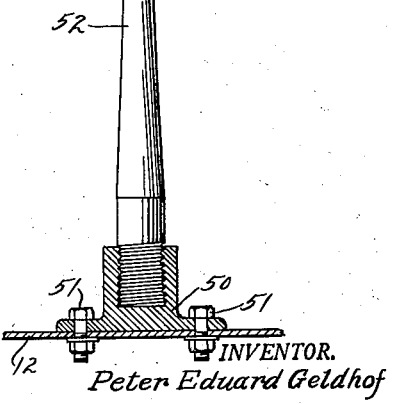
INVENTOR.
Peter Eduard Geldhof
BY Patented Mar. 18, 1952

2,589,796

UNITED STATES PATENT OFFICE 2,589,796

VIBRATION REDUCING SUPPORT FOR WASHING MACHINES AND THE LIKE

Peter Eduard Geldhof, St. Joseph, Mich., assignor to Whirlpool Corporation, a corporation of New York Application May 23, 1946, Serial No. 671,843

14 Claims. (Cl. 248—22)

This invention relates to a supporting structure for a load mounted for rotation about a vertical axis, and more particularly, to a vibration reducing support for washing machines and the like.

Various means have been devised in the past for providing a floating support or base for rotating bodies, and particularly for bodies which rotate about a vertical axis. It has been common practice in the household laundry machine art to mount the tub with its rotating basket therein on a base which is suspended from a frame member by a plurality of downwardly depending arms. The center of mass of the suspended body in such arrangement has heretofore been well below the points on the frame from which the mass is suspended.

There have also been spring arrangements in the past, such for example as spring feet, which support motors and other masses as vibration dampening or cushioning means.

One of the principal features and objects of the present invention is to provide a novel method and means for supporting a rotating mass on a floating base member, the base member being supported on a plurality of downwardly extending legs which have certain freedom of movement in horizontal plane, but substantially no freedom of movement in a vertical plane.

Another object of the present invention is to provide a novel vibration reducing support for washing machines and the like.

A still further object of the present invention is to provide a novel support structure for a centrifuge.

Another and further object of the present invention is to provide a novel method and means for introducing an inertia factor in a floating base to substantially reduce vibration thereof.

The novel features which I believe to be characteristic of my invention are set forth with particularity in the appended claims. My invention is such, however, both as to its organization and manner of construction, together with further objects and advantages thereof, may best be understood by reference to the following description taken in connection with the accompanying drawing, in which:

Figure 1 is a front elevational view of a washing machine embodying the novel principles and features of the present invention with the cabinet broken away to show the manner in which the operating mechanism of the washing machine is supported;

Figure 2 is an enlarged view of one of the supporting legs of the washing machine with portions of the main frame structure and floating base structure shown in section;

Figure 5 is a fragmentary view of the upper end of a supporting leg of a modified form of the present invention; and Figure 6 is a view of a leg structure of a third embodiment of the present invention.

Figure 3:
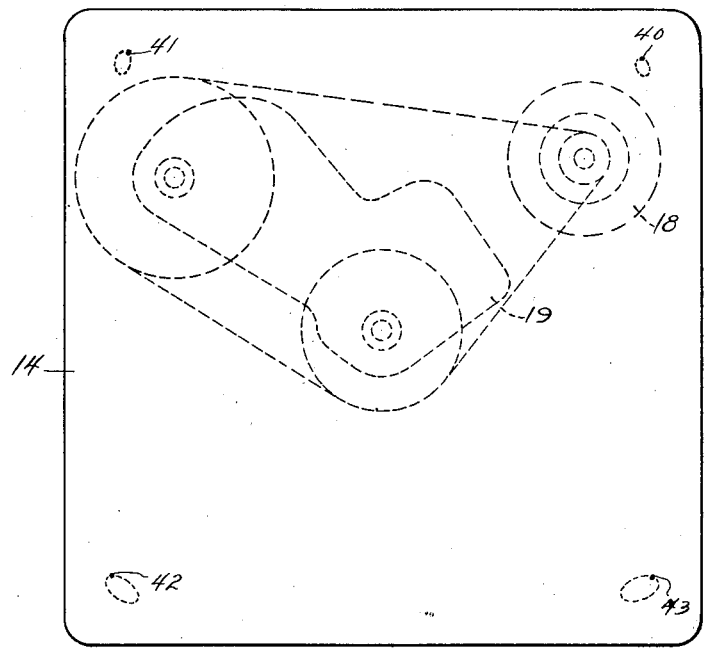
Figure 3 is a diagrammatic plan view of the floating base illustrating the relative position of the motor and the transmission unit of the washing machine and also illustrating the relative extent of movement of the different corners of the floating base.

Referring to the embodiment of the invention illustrated in Figure 1 of the drawing the washing machine 10 includes a cabinet 11 carried on a substantially rigid base frame 12 which in turn is supported by a plurality of feet 13.

Mounted within the cabinet 11 on a base 14 is a tub 15 which is of course arranged to receive and to hold water. This tub 15 includes a top or collar portion 15' through which clothes may be inserted into the interior of the tub 15. Mounted for rotation within the tub 15 is a basket 16 which is arranged to receive and carry the clothes. After the washing operation the clothes are partially dried by rotating the basket 16 at high speed. Mounted within the basket 16 is the usual form of agitator 17 which operates back and forth during the washing while water is carried within the tub 15 to wash the clothes. The agitator 17 is arranged to be oscillated by power derived from the motor 18 through the transmission 19. The basket 16 is also arranged to be rotated at high speed from the motor 18.

It is to be noted that the tub 15, the basket 16, the agitator 17, the motor 18 and the transmission 19 are all mounted directly on the sub-base 14, the motor 18 and the transmission 19 being suspended from the sub-base 14 by the depending arm or bracket members 20 and 21 respectively.

The sub-base 14 is supported on four legs 22. One of these legs 22 is illustrated in detail in Figure 2 of the drawing. More particularly, the leg 22 is preferably made of a steel rod 23 which is threaded into a foot 24 at its upper end and a foot 25 at its lower end. The foot 24 is embedded in a rubber block 26 carried in a cup-shaped member 27 on the sub-base 14. The cup-shaped member 27 is formed of two confronting halves 28 and 29 which are bolted together onto the sub-base 14 by means of the bolt 30 and cooperating nut 31. It will be further observed that the lower cup half 29 has an opening 32 therein which is slightly larger than the shank portion 33 on the foot 24.

The lower end of the rod 23 is similarly secured by upper and lower cup-shaped members 33 and 34 which contain a block of rubber 35 in which the foot 25 is embedded. The upper cup-shaped member 33 has a relatively large opening 36 therein through which the shank 37 of the foot 25 extends. Two cup-shaped halves are bolted together and to the frame member 12 by bolts 38 and nut 39.

With supporting legs of the type described above, it will be understood that vertical movements of the lower ends of the legs with respect to the frame 12 are opposed but the sub-base 14 has freedom of movement in substantially a horizontal plane. The whole assembly, however, does not teeter over (as would, of course, be the case if the legs were connected to the sub-base 14 and to the frame 12 by a ball and socket joint), due to the relative stiffness of the rubber blocks 26 and 35.

With a structure as above described, an extremely inexpensive and yet efficient structure is provided in which vibration, and particularly vibration transmitted to the frame, is reduced to a very large extent. It has been found in practice that if four spots are put on the four corners of the sub-base 14, that they describe paths of movement as shown in Figure 3 of the drawing. It will be noted that the spot 40 decribes substantially a circle while the spots 41, 42 and 43 describe elliptical paths. The amount of movement, however, is relatively small.

Figure 4:
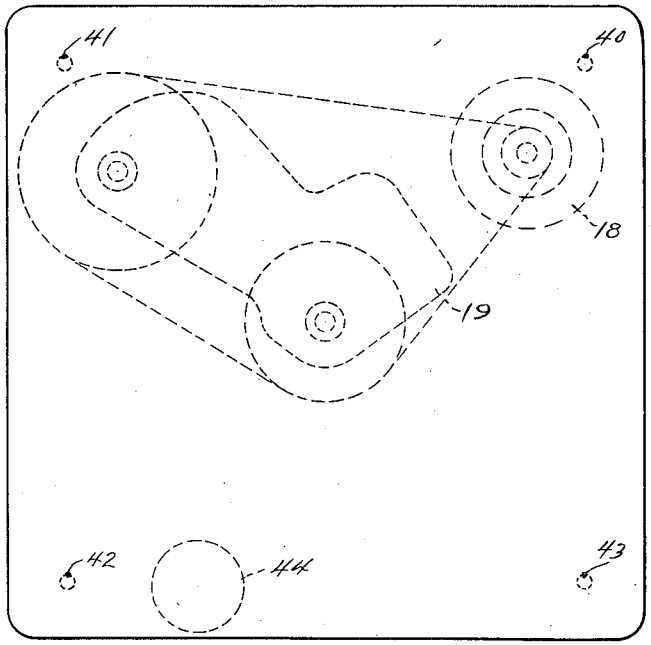
Figure 4 is a view similar to Figure 3 but illustrating how the vibration is reduced by the addition of an inertia member at a predetermined point on the floating base.

It has been found that this movement of the sub-base 14 may be still further reduced by mounting a weight 44 on the sub-base in a position generally opposite the motor 18. The location of the weight 44 is determined by noting the size of any elliptical paths made by the spots 40, 41, 42 and 43. It is believed that the spots 41, 42 and 43 make elliptical paths while the spot 40 makes substantially a circle due to the fact that the center of mass is located in the general region of the corner adjacent the spot 40. There is, of course, a great deal more inertia near the center of mass than there is in the regions remote from the center of mass. The whole sub-base 14, therefore, tends to rock back and forth about the center of mass. By mounting the weight 44 in the vicinity of the corner opposite from the corner where the spot 40 makes substantially a circle, and by making it sufficiently heavy the center of mass may be moved substantially to a center position in the sub-base 14. It has been further found that the weight 44 should preferably be located substantially in the same horizontal plane as the original center of mass was located. Thus the weight 44 is preferably mounted in the same general horizontal region as the motor 18 and the transmission 19. It has been found in practice that when the spots 40, 41, 42 and 43 are then observed, after the mounting of the weight on the sub-base 14 in the manner just described, all four of these spots make substantially circular paths as indicated in Figure 4 of the drawing. With such a mounting assembly, not only is the transmission of vibration substantially eliminated in the frame 12 and the housing 11 but also movement of the sub-base 14 is reduced to a very appreciable extent. This is true even when an exceptionally large unbalanced load is being rotated in the basket 16 such as might be occasioned by a batch of clothes or a blanket being located on one side of the basket only.

A second embodiment of the present invention is illustrated in Figure 5 of the drawing. More particularly, the leg 23 with its foot 24 is embedded in a rubber block 45. The rubber block 45 in this case, however, differs from the rubber block 26 in that it not only surrounds the base of the foot 24 but also extends up over the shank portion 33 and partially around the axial rod 23. This additional tapered portion 46 on the block 45 adds greater stiffness to the foot assembly. It will be observed that in this particular case, the lower cup-shaped member 29 has a much larger opening therein as indicated at 47 through which the tapered portion 46 of the rubber block 45 extends.

A third form of leg structure is shown in Figure 6 of the drawing. In this case, the rubber blocks are eliminated and the leg 22 is screwed directly into an end block 48 which is preferably formed of steel or the like. The end block 48 is bolted as at 49 to the sub-base 14. A similar end block 50 receives the lower end of the leg 22, the end block 50 being bolted as at 51 to the frame 12. The necessary resiliency of the supporting structure in this case is obtained by employing a rod 52 for the leg 22 which becomes narrower in cross section near the middle. The rod 52 is preferably made of spring steel or the like.

While I have shown certain particular embodiments of my invention, it will, of course, be understood that I do not wish to be limited thereto, since many modifications may be made, and I, therefore, contemplate by the appended claims to cover all such modifications as fall within the true spirit and scope of my invention.

I claim as my invention:

1. A support for a rotating mass comprising a base, a sub-base on which said mass is rotatably mounted, a motor for driving said mass mounted on said sub-base, a plurality of legs extending downwardly from said sub-base to said base and supporting said sub-base in vertically spaced relation with respect to said base, means within the limits of said sub-base and substantially unyieldable in a direction longitudinally of the legs but resiliently yieldable in a lateral direction for securing said legs at their upper ends to said sub-base and at their lower ends to said base.

2. A support for a rotating mass comprising a base, a sub-base on which said mass is rotatably mounted, a motor for driving said mass mounted on said sub-base, a plurality of legs extending downwardly from said sub-base to said base and supporting said sub-base in vertically spaced relation with respect to said base, means within the projected horizontal limits of said sub-base and substantially unyieldable in a direction longitudinally of the legs but resiliently yieldable in a lateral direction for securing said legs at their upper ends to said sub-base and at their lower ends to said base, the center of mass of said sub-base and the assembly of parts mounted thereon being substantially at the center of said sub-base.

3. A support for a rotating mass comprising a base, a sub-base on which said mass is rotatably mounted, a motor for driving said mass mounted on said sub-base, a plurality of legs extending downwardly from said sub-base to said base and supporting said sub-base on said base in vertically spaced relation with respect thereto, means substantially unyieldable in a direction longitudinally of the legs but resiliently yieldable in a lateral direction for securing said legs at their upper ends to said sub-base and at their lower ends to said base, the center of mass of said sub-base and the assembly of parts mounted thereon being slightly below said sub-base insofar as its vertical height is concerned and substantially at the center of said sub-base insofar as its horizontal location is concerned and said legs being within the projected horizontal limits of said sub-base in all positions of said sub-base with respect to said base.

4. A support for a rotating mass comprising a base, a sub-base on which said mass is rotatably mounted, a motor for driving said mass mounted on said sub-base, a plurality of legs extending downwardly from said sub-base to said base and supporting said sub-base on said base in vertically spaced relation with respect thereto, securing means for fastening the ends of said legs to said sub-base and to said base, the securing means at each end of said legs being in the form of a block of resilient material in which the end of said leg is embedded and secured, housing members encasing said blocks, said housing members being secured to said sub-base and to said base at the opposite ends of said legs respectively, said housing members having openings therein through which said legs extend and said openings being slightly wider than said legs thereby to permit limited angular movement of said legs with respect to said housing members and being located within the projected horizontal limits of said sub-base.

5. A support for a rotating mass comprising a base, a sub-base on which said mass is rotatably mounted, a motor for driving said mass mounted on said sub-base, a plurality of legs extending downwardly from said sub-base to said base, securing means for fastening the ends of said legs to said sub-base and to said base, the securing means at the end of said legs being in the form of a block of resilient material in which the end of said leg is embedded and secured, housing members surrounding said block, said housing members being secured to said sub-base and to said base at the opposite ends of said legs respectively, said housing members having openings therein through which said legs extend and said openings being slightly wider than said legs thereby to permit limited angular movement of said legs with respect to said housing, a portion of each resilient block extending out of its associated housing and up around the adjacent portion of its associated leg.

6. A support for a rotating mass comprising a base, a sub-base on which said mass is rotatably mounted, a motor for driving said mass mounted on said sub-base, a plurality of legs extending downwardly from said sub-base to said base, securing means for fastening the ends of said legs to said sub-base and to said base respectively, each of said securing means including a housing, a block of resilient material in said housing in which the end of a leg is embedded and secured, said housing having an opening therein through which a portion of said resilient block extends out and around a portion of said leg exterior of said housing.

7. A support for a rotating mass comprising a base, a sub-base on which said mass is rotatably mounted, a motor for driving said mass mounted on said sub-base, a plurality of legs substantially rigid as to endwise movement extending downwardly from said sub-base to said base, the ends of said legs being substantially rigidly secured to said base and said sub-base, said legs being gradually narrower in cross-section near their center.

8. A support for a rotating mass comprising a base, a sub-base on which said mass is rotatably mounted, a motor for driving said mass and mounted on said sub-base, a plurality of leg elements extending downwardly from said sub-base to said base and supporting said sub-base on said base in vertically spaced relation with respect thereto, said leg elements being substantially unyieldable in a direction longitudinally thereof but resiliently yieldable in a lateral direction and being within the horizontal limits of said sub-base in all positions of lateral movement of said sub-base with respect to said base.

9. A support for a rotating mass comprising a base, a sub-base on which said mass is rotatably mounted, a motor for driving said mass and mounted on said sub-base, a plurality of substantially vertical leg elements extending downwardly from said sub-base to said base, said leg elements being substantially unyieldable in a direction longitudinally thereof but resiliently yieldable in a lateral direction, and means mounted on said sub-base for moving the otherwise normal center of mass close to the center of said sub-base.

10. A support for a rotating mass comprising a base, a sub-base on which said mass is rotatably mounted substantially at the center thereof, a motor for driving said mass and mounted on said sub-base in proximity to one side thereof, a plurality of substantially vertical leg elements extending downwardly from said sub-base to said base and supporting said sub-base in vertically spaced relation with respect to said base, said elements being substantially unyieldable in a direction longitudinally of said elements but resiliently yieldable in a lateral direction and a mass substantially comparable in weight to said motor and mounted on said sub-base at the opposite side of said center from said motor, thereby to move the center of mass of said sub-base and the assembly of parts mounted thereon closer to the center of said sub-base.

11. A vibration reducing support for a rotatable mass comprising a base, a sub-base spaced vertically from said base and having the mass rotatably mounted thereon and extending upwardly therefrom at substantially the center thereof, a motor mounted on said sub-base eccentric with the center thereof and depending therefrom, means rotatably driving said mass from said motor, a weight depending from said sub-base and counterbalancing said motor, a plurality of housing members mounted on said base in a definite spaced relation with respect thereto, a plurality of cooperating housing members mounted on said sub-base in the same spaced relation as said housing members on said base and opening toward said housing members on said base, a plurality of vertical support legs supporting said sub-base on said base, and yieldable blocks having opposite ends of said legs embedded therein and housed within said housing members in said base and said sub-base and supporting said sub-base on said base under compression and affording a laterally yieldable connection between said legs and said base and sub-base but confined within said housings so as to hold said legs from vertical movement with respect thereto.

12. A vibration reducing support for a rotating mass comprising a base, a sub-base spaced vertically from said base and having the mass rotatably mounted thereon substantially at the center thereof and extending upwardly therefrom, a motor mounted on said sub-base and depending therefrom, means rotatably driving said mass from said motor, four spaced housing members on said base opening toward said sub-base, four corresponding cooperating housing members on said sub-base opening toward said base, said housing members being spaced at the corners of a rectangle, a vertical support leg mounted at its opposite ends in each set of cooperating housing members and embedded at its ends in a solid resilient block, each of said blocks being housed within said housing members in said base and said sub-base and restrained from vertical movement therein and supporting said sub-base on said base under compression, and forming laterally yieldable supporting members for said sub-base on said base.

13. In a washing machine including a tub, a clothes container mounted therein for rotation about a vertical axis, a base, a sub-base spaced upwardly therefrom and having said tub and clothes container extending upwardly therefrom, a motor depending from said sub-base, means for rotatably driving said clothes container from said motor, the improvements comprising a vibration reducing support for said sub-base on said base, supporting said sub-base on said base in vertically spaced relation with respect thereto for limited movement in a confined horizontal path and holding said sub-base from vertical movement with respect to said base and comprising a plurality of housing members mounted on said base in a definite spaced relation with respect thereto, a plurality of cooperating housing members mounted on said sub-base in the same spaced relation as said housing members on said base and opening toward said housing members on said base, and a plurality of vertical support legs having yieldable blocks mounted on each end thereof and encased and restrained from vertical movement in said cooperating housing members on said base and said sub-base.

14. A support for a rotating clothes container comprising a base, a sub-base spaced vertically from said base and having the clothes container rotatably mounted thereon, a motor on said sub-base for driving said clothes container, a plurality of generally vertically extending legs for supporting said sub-base in vertically spaced relation with respect to said base, said legs being rigidly connected to said base at their lower ends and to said sub-base at their upper ends and uniformly tapering from their ends toward their transverse center.

PETER EDUARD GELDHOF.

REFERENCES CITED

The following references are of record in the file of this patent:

UNITED STATES PATENTS

| Number | Name | Date |
|---|---|---|
| 1,564,770 | Eynon | Dec. 8, 1925 |
| 1,696,718 | Kuhlmann et al. | Dec. 25, 1928 |
| 1,876,704 | Lipcot | Sept. 13, 1932 |
| 1,973,510 | Schieferstein | Sept. 11, 1934 |
| 2,199,481 | Chappell | May 7, 1940 |
| 2,215,743 | Saurer | Sept. 24, 1940 |
| 2,256,752 | Saurer | Sept. 23, 1941 |
| 2,347,190 | Geldhof et al. | Apr. 25, 1944 |
| 2,347,969 | Rubly et al. | May 2, 1944 |
| 2,368,788 | Geldhof et al. | Oct. 16, 1945 |
| 2,420,592 | Gerhardt | May 13, 1947 |